(12) United States Patent
Dimsey et al.

(10) Patent No.: US 7,475,758 B2
(45) Date of Patent: Jan. 13, 2009

(54) BICYCLE DISC BRAKE HAVING NON-CONTINUOUS SPLINE SURFACE FOR QUICK CONNECTION TO OR RELEASE FROM A WHEEL HUB

(75) Inventors: James J. Dimsey, Elm Grove, WI (US); Darren J. Campbell, Menomonee Falls, WI (US); William V. Jacob, Chagrin Falls, OH (US)

(73) Assignee: Hayes Bicycle Group, Inc., Mequon, WI (US)

( * ) Notice: Subject to any disclaimer, the term of this patent is extended or adjusted under 35 U.S.C. 154(b) by 78 days.

(21) Appl. No.: 11/157,211

(22) Filed: Jun. 20, 2005

(65) Prior Publication Data

US 2006/0054422 A1 Mar. 16, 2006

Related U.S. Application Data (60) Provisional application No. 60/580,895, filed on Jun. 18, 2004, provisional application No. 60/620,570, filed on Oct. 20, 2004.

(51) Int. Cl.
*B62L 5/00* (2006.01)
(52) U.S. Cl. ............... 188/26; 188/218 XL; 188/18 A; 188/17
(58) Field of Classification Search ............ 188/24.11, 188/26, 218 XL, 18 A, 17; 301/110.5, 111.02; 403/359.1, 359.2, 359.3, 359.4, 359.5, 359.6, 403/379.2; 464/182
See application file for complete search history.

(56) References Cited

U.S. PATENT DOCUMENTS

| | | | | |
|---|---|---|---|---|
| 3,480,310 A | * | 11/1969 | McElwain | 403/322.2 |
| 3,926,532 A | * | 12/1975 | Schlenker et al. | 403/322.2 |
| 4,303,149 A | * | 12/1981 | Lech, Jr. | 192/70.19 |
| 4,392,759 A | * | 7/1983 | Cook | 403/11 |
| 4,473,317 A | * | 9/1984 | Bolang | 403/359.2 |
| 4,603,998 A | * | 8/1986 | Bober et al. | 403/322.2 |
| 6,206,144 B1 | | 3/2001 | Di Bella | |
| 6,371,252 B1 | | 4/2002 | Kanehisa | |
| 6,964,323 B2 | | 11/2005 | Campbell | |

OTHER PUBLICATIONS

Shimano Disc Brake Systems Service Manual, vol. 1, pp. 1-40.

* cited by examiner

*Primary Examiner*—Robert A Siconolfi
*Assistant Examiner*—Vu Q Nguyen
(74) *Attorney, Agent, or Firm*—Whyte Hirschboeck Dudek SC (57) ABSTRACT

A disc brake rotor comprises an internally disposed splined surface defining a circular opening and including one or more axially disposed internal splines that are adapted to be received on external splines of a splined structure of a wheel hub, the surface including a non-continuity such as a cutaway portion of the surface into which independent splines are selectively actuable to align with the internal splines as a part of the surface to allow the rotor to be connected to or released from the hub without using any tools or the like. Preferably, the independent splines are finger actuable, and provide through a workpiece comprising a locking hammer of locking foot.

12 Claims, 8 Drawing Sheets

FIG. 1
PRIOR ART

HUB

ROTOR FIXING BOLTS

ROTOR

ALLEN WRENCH

ROTOR

HUB

FIG. 2

PRIOR ART

BICYCLE DISC BRAKE HAVING NON-CONTINUOUS SPLINE SURFACE FOR QUICK CONNECTION TO OR RELEASE FROM A WHEEL HUB

CROSS-REFERENCES TO RELATED APPLICATIONS

This application claims priority under 35 U.S.C. § 119(e) to Provisional Patent Application Ser. No. 60/580,895, filed Jun. 18, 2004 and Provisional Patent Application Ser. No. 60/620,570, filed Oct. 20, 2004, the disclosures of which are hereby incorporated by reference.

STATEMENT REGARDING FEDERALLY SPONSORED RESEARCH OR DEVELOPMENT

Reference to Microfiche Appendix

BACKGROUND OF THE INVENTION

1. Field of the Invention

In general, this invention relates to bicycle braking systems, and, more specifically, to a bicycle disc brake having an non-continuous spline surface to permit quick connection to or release from a wheel hub.

2. Description of Related Art

Bicycling is a popular form of transportation, recreation, and sport. As such, the bicycle industry continues to improve all sorts of bicycle components, including bicycle braking systems.

Numerous bicycle braking systems are currently available. For example, common bicycle braking systems include pedal brakes, rim brakes, and disc brakes. Riders who seek high performance bicycle braking systems often prefer disc brakes, as they provide high levels of consistency in nearly all types of weather and riding conditions, and they provide substantial braking power in proportion to the amount of braking force that riders need to apply to their brake levers in order to control their brakes. At a high level, bicycle disc brakes generally comprise one or more of the following: i) one or more brake levers secured to a bicycle frame for controlling braking operations; ii) one or more disc brake rotors secured to the wheel hubs of a bicycle; and iii) one or more calipers operatively coupling the one or more brake levers to the one or more disc brake rotors.

Figure 1:
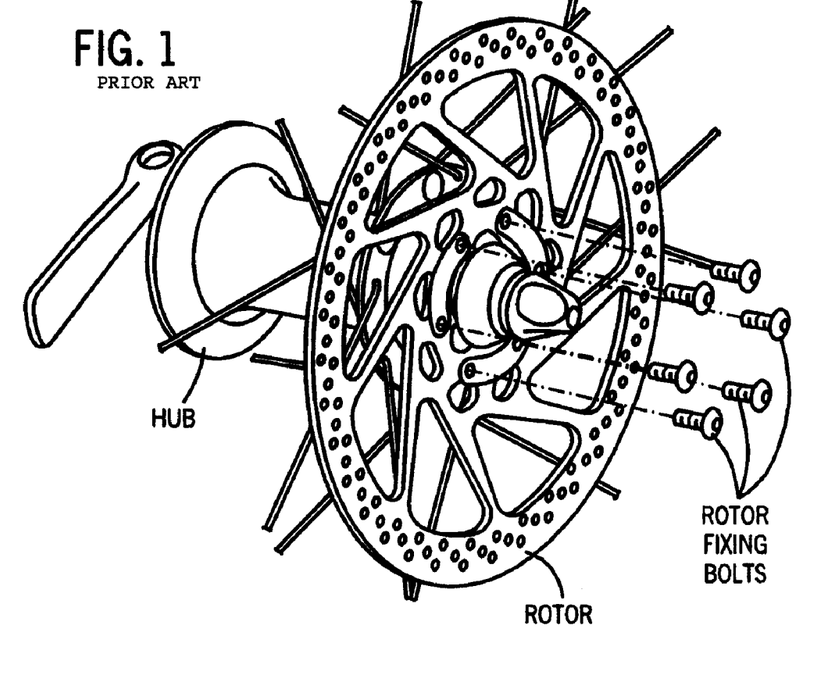
FIGS. 1-2 depict conventional bicycle disk brakes in which disc brake rotors are secured to hubs using bolts.
Figure 2:
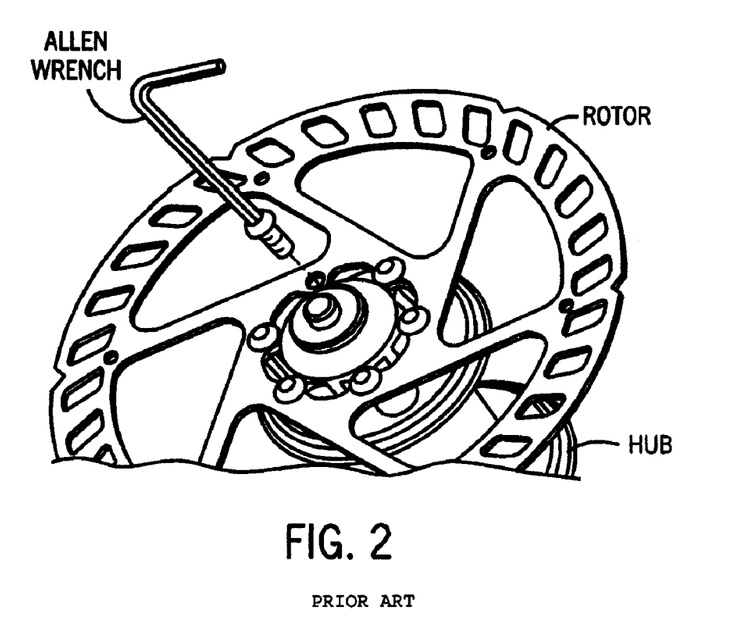
Figure 3:
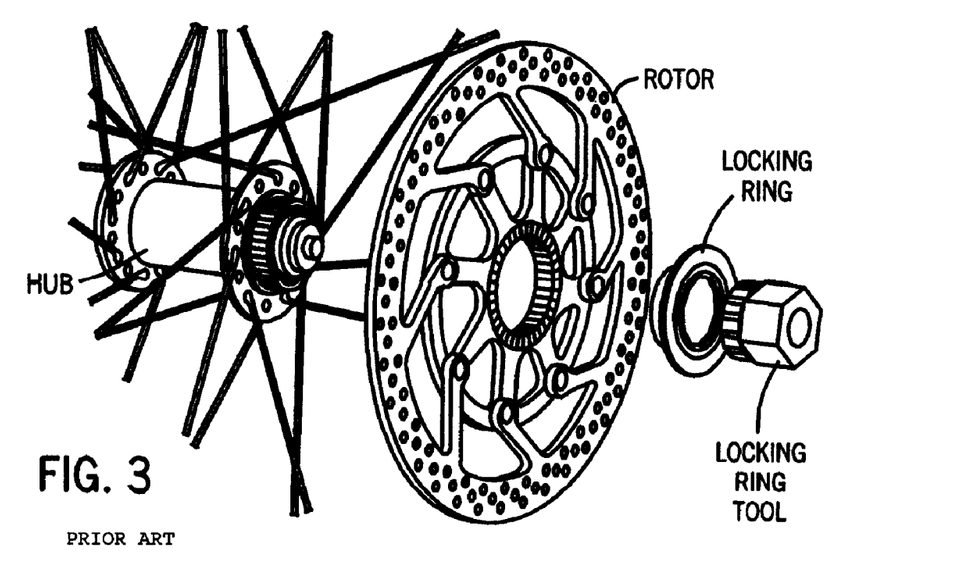
FIGS. 3-4 depict conventional bicycle disk brakes in which disc brake rotors are secured to hubs using locking rings.
Figure 4:
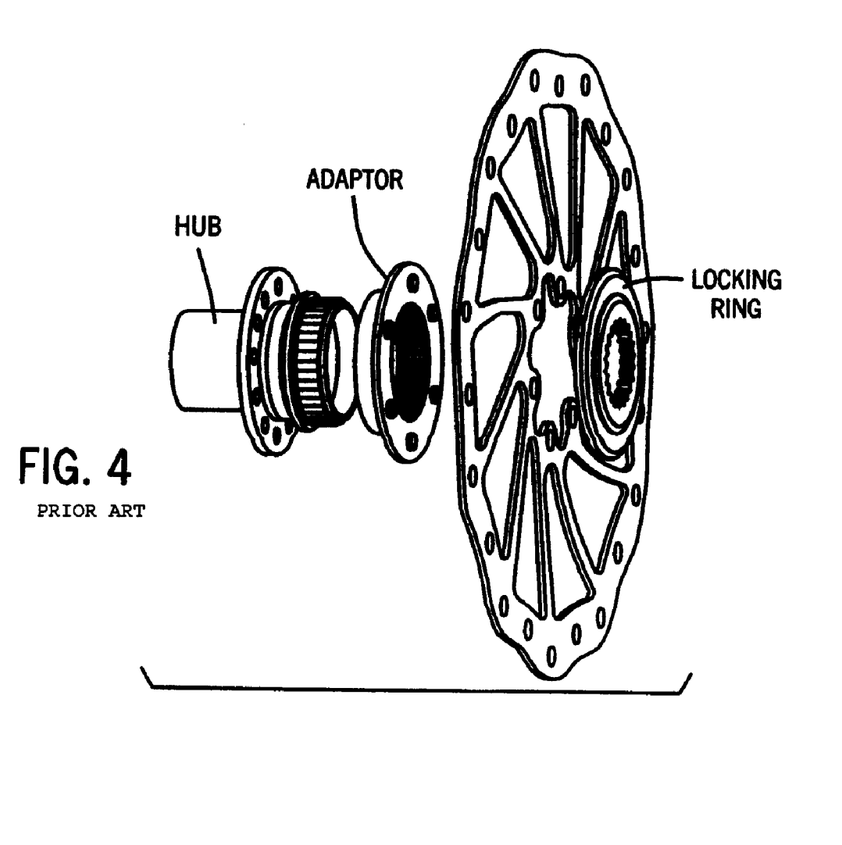
Figure 5:
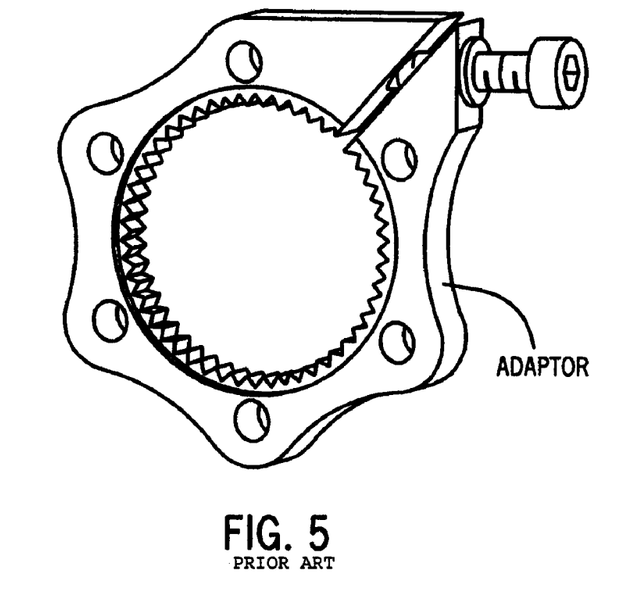

Disc brake rotors have been secured to wheel hubs in numerous ways. For example, as shown in FIGS. 1-2, disc brake rotors can be secured to wheel hubs using bolts, including, for example, by using a well-known six-bolt mounting pattern. However, this approach requires tools, which may not always be available or convenient. Alternatively, as shown in U.S. Pat. No. 6,206,144 to Di Bella and U.S. Pat. No. 6,371,252 to Kanehisa, the disclosures of which are hereby incorporated by reference, disc brake rotors can also be secured to wheel hubs using locking rings to mate splined portions of the rotors to splined portions of the wheel hubs. Additional locking ring arrangements are also shown in FIGS. 3-4, and FIGS. 4-5 also depict a splined adapter used to secure disc brake rotors having the six-bolt mounting pattern to splined wheel hubs. However, securing disk brake rotors to wheel hubs using locking rings again requires tools, which may not always be available or convenient. In addition, the mating surfaces of locking rings damage easily, which can subsequently prevent their proper installation. Locking rings can also be physically separated from their rotors and wheel hubs, which introduces a further possibility of loss.

As a result of the foregoing deficiencies, there exists a need for improved bicycle disc brakes, particularly ones in which disc brake rotors can be axially connected to and released from wheel hubs without using any bolts, locking rings, tools, or adapters. As such, the present invention addresses these needs, as well as other needs, which will become apparent to those skilled in the art. Accordingly, one non-limiting object of the present invention is to provide improved bicycle disc brakes in which disc brake rotors can be axially connected to and released from wheel hubs without using any bolts, locking rings, tools, or adapters. Such an arrangement allows the disc brake rotors to be quickly and easily connected to and released from the wheel hubs.

Another non-limiting object of the present invention is to provide a quick connect/release for a bicycle disc brake that is lightweight, compact in design, and cost effective to manufacture and use. Yet another non-limiting object of the invention is to provide bicycle disk brakes with high braking power and reliability under diverse working conditions. And yet, still another non-limiting object of the invention is to provide bicycle disk brakes that are easy to assemble, disassemble, reassemble, and maintain, as well as ones that can be installed on existing wheel hubs with either little or no modifications thereto. In sum, it is thus a non-limiting object of the present invention to provide a bicycle disc brake having a non-continuous spline surface to permit quick connection to or release from a wheel hub.

SUMMARY OF THE INVENTION

The inventive arrangements provide a disc brake rotor, comprising: an internally disposed splined surface defining a circular opening and including one or more axially disposed internal splines that are adapted to be received on external splines of a splined structure of a wheel hub, the surface including a non-continuity. In a preferred embodiment, the non-continuity includes a cut-away portion of the surface into which independent splines are selectively actuable. Preferably, the independent splines are selectively actuable to align with the internal splines as a part of the surface to allow the rotor to be connected to or released from the hub without using any tools or the like. Preferably, the independent splines are finger actuable.

The inventive arrangements also provide a disc brake rotor, comprising: a non-continuous internally disposed splined surface defining a circular opening and including one or more axially disposed internal splines that are adapted to be received on external splines of a splined structure of a wheel hub. In a preferred embodiment, the surface is adapted to receive independent splines to align with the internal splines as a part of the surface. In another preferred embodiment, the independent splines are selectively actuable to align with the internal splines as a part of the surface to allow the rotor to be connected to or released from the hub without using any tools or the like.

The inventive arrangements also provide a disc brake rotor, comprising: an internally disposed splined surface defining a circular opening and including one or more axially disposed internal splines that are adapted to be received on external splines of a splined structure of a wheel hub; and a workpiece having independent splines that are selectively actuable to align with the internal splines as a part of the surface. In a preferred embodiment, the workpiece is supported by a carrier pocket of the rotor. In another embodiment, the workpiece includes a locking hammer that carries the independent splines, which may includes a void space into which the independent splines flex upon alignment with the internal splines. Preferably, the locking hammer is rotable to bring the independent splines into alignment with the internal splines. In another embodiment, the workpiece includes a locking foot that carries the independent splines. Preferably, the locking foot is thread-wise rotable to bring the independent splines into alignment with the internal splines, which may involve a thumb wheel.

BRIEF DESCRIPTION OF THE SEVERAL VIEWS OF THE DRAWINGS

A clear conception of the advantages and features constituting inventive arrangements, and of various construction and operational aspects of typical mechanisms provided therewith, will become readily apparent by referring to the following exemplary, representative, and non-limiting illustrations, which form an integral part of this specification, wherein like reference numerals generally designate the same elements in the several views, and in which:

FIGS. 4-5 depict rotor adapters for conventional bicycle disk brakes in which adapters are adapted to interface between bicycle disc brake rotors and hubs;

DETAILED DESCRIPTION OF PREFERRED EMBODIMENTS

Figure 6:
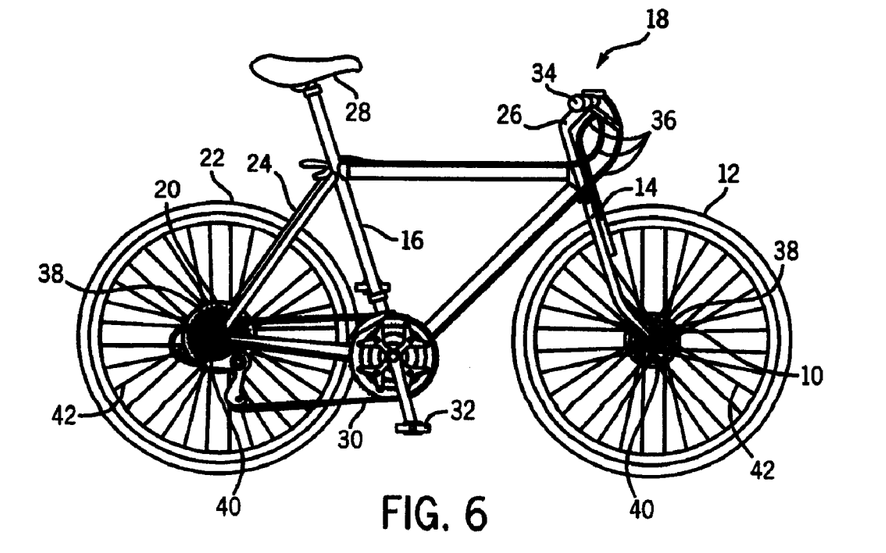
FIG. 6 is a side-elevation view of a conventional bicycle having the disk brake rotors of the present invention.

Referring now to FIG. 6, a front disc brake 10 is adapted to operate on a front wheel 12 that is attached to a fork 14 of a frame 16 of a representative bicycle 18, while a rear disc brake 20 is adapted to operate on a rear wheel 22 that is attached to a rear portion 24 of the frame 16 of the bicycle 18. Preferably, the frame 16 also generally supports one or more of the following: i) a handlebar 26 proximal to the fork 14 for turning the front wheel 12; ii) a seat 28 proximal to the rear portion 24 of the frame 16 for seating a rider (not shown); and iii) a drive chain 30 for imparting rotable forces to the rear wheel 22 via rotable engagement of a pair of pedals 32 that are vertically disposed on opposing sides of the frame 16.

Since many of these (and other conventional) parts of the bicycle 18 are well-known, they are not generally described or otherwise illustrated herein, except as they will relate to the inventive arrangements. For example, brake pads, derailleurs, drive sprockets, and the like, are not generally described or otherwise illustrated herein, although they can be commonly used in conjunction with the bicycle 18 and the present invention. By way of representative example, the handle bar 26 of the bicycle 18 is shown carrying brake levers 34 and calipers 36 for the front disc brake 10 and the rear disc brake 12 (as well as the drive chain 30), although other parts of the frame 16 of the bicycle 18 can likewise carry these components.

As depicted, the bicycle 18 is provided with a front disc brake 10 and a rear disc brake 20, which are basically identical, except the front disc brake 10 relates to the front wheel 12 and the rear disc brake 20 relates to the rear wheel 22. Thus, the front disc brake 10 and the rear disc brake 20 preferably use many or all of the same parts. As a result, subsequent references to "front" or "rear" are generally eliminated hereinout as a convenience to the reader, with one necessarily describing the other, and with generally equal applicability. Accordingly, either or both of the disc brakes 10, 20 of the present invention generally comprise one or more of the following: i) a disc brake rotor ("rotor") 38; and ii) a wheel hub ("hub") 40, which generally forms a part of, and supports, either the front wheel 12 or the rear wheel 22 through respective spokes 42 (which are only representatively labeled in the figures).

Figure 7:
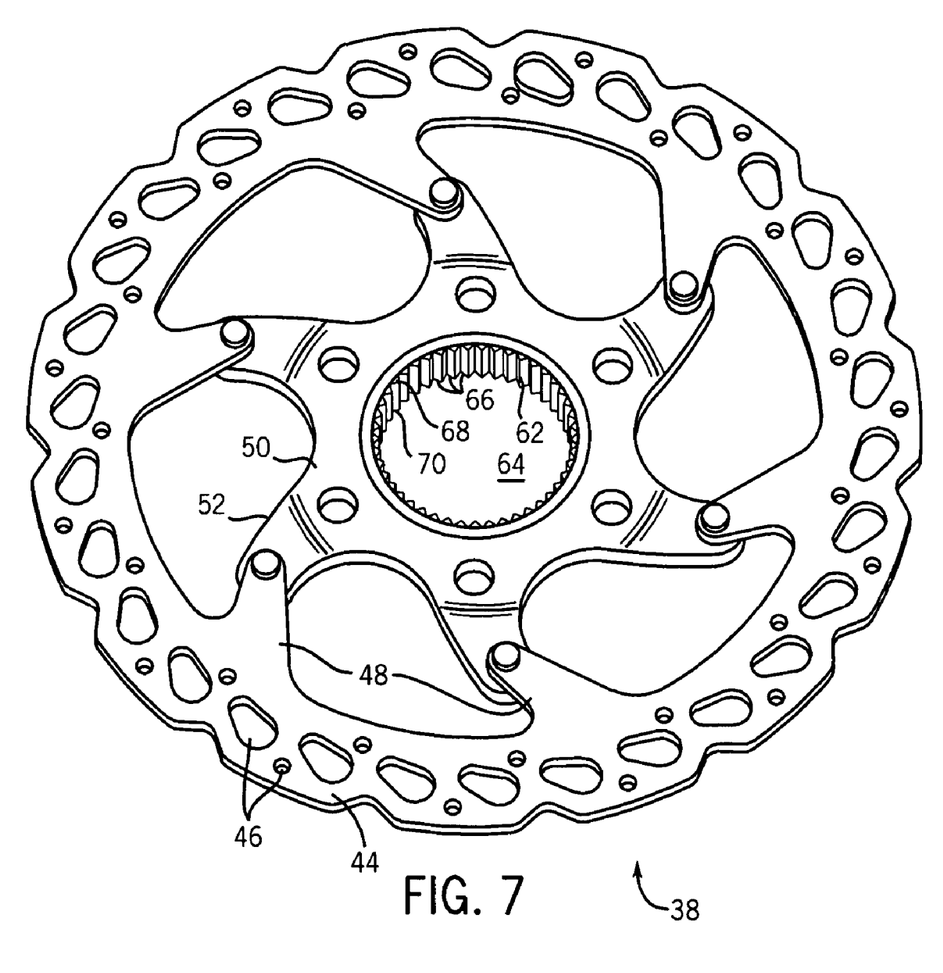
FIG. 7 is top view of conventional rotor that can be adapted to practice the inventive arrangements.

Referring now more specifically to the rotor 38, it is, in part, a conventional two-piece rotor 38, preferably comprising one or more of the following: i) a rub area 44 that is generally circular or semi-circular in shape and that has optional cooling and lightening holes 46 disposed therein (which are only representatively labeled in the figures) for contacting a friction element (e.g., a brake pad) (not shown), as well as one or more internally protruding arms 48 (which are only representatively labeled in the figures); and ii) an internal carrier 50 that is generally surrounded annularly by the rub area 44 and that has one or more externally protruding arms 52 (which are only representatively labeled in the figures) for mating alignment with, and securitization to, the internally protruding arms 48 of the rub area 44, all by techniques that are well-known in the art. As such, the rub area 44 is generally coupled to, and disposed circumferentially around, the internal carrier 50, such that the rub area 44 and the internal carrier 50 are generally concentrically arranged about the hub 40 in operation. However, the invention is not intended to be limited in this regard, as the rub area 44 and the internal carrier 50 can be made equally of unitary construction, with little, if any, distinction therebetween. Thus, other conventional parts of the rotor 38 are not generally described or otherwise illustrated herein, except as they will relate to the inventive arrangements.

Figure 8:
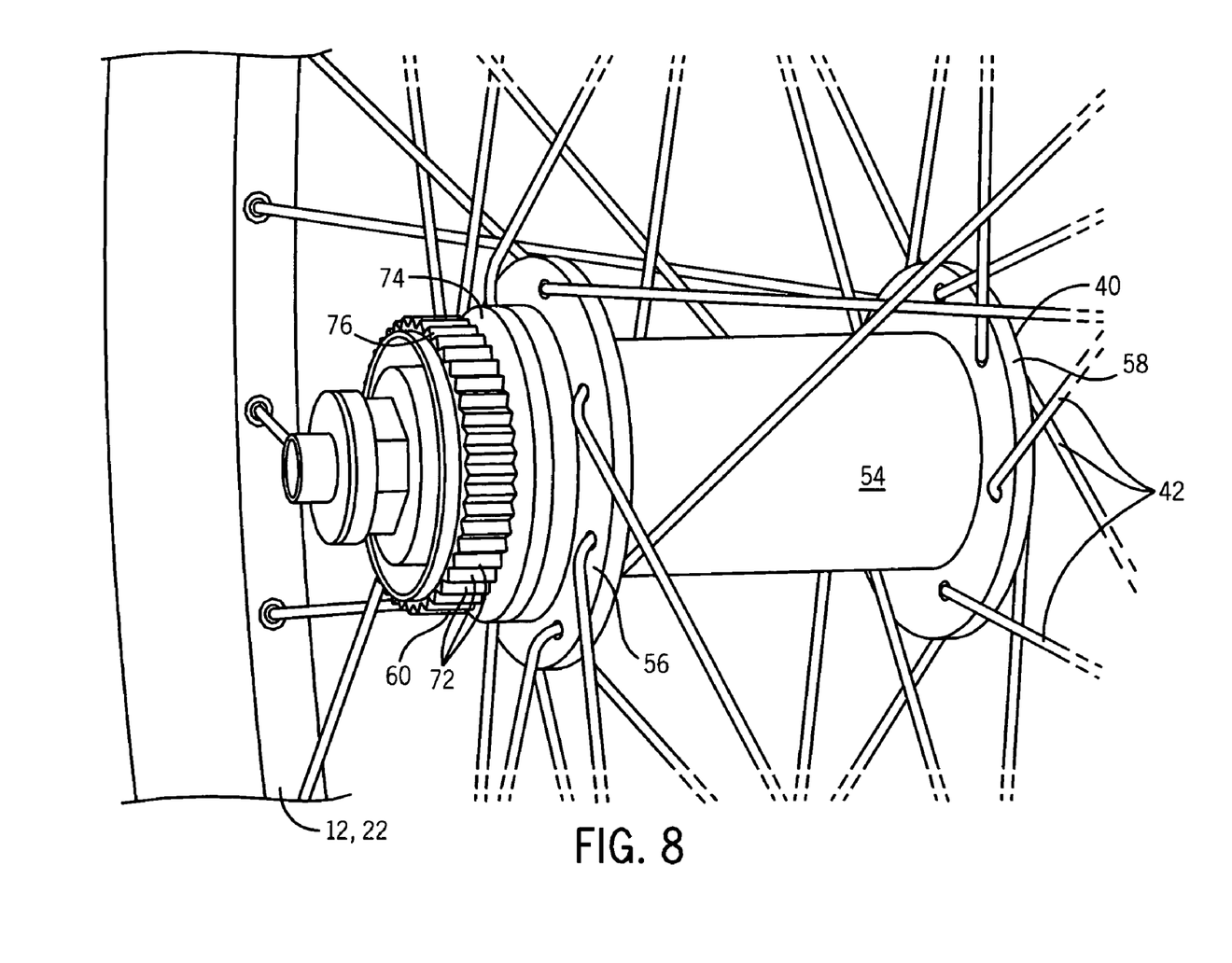
FIG. 8 is a perspective view of a conventional hub that can receive the disc brake rotors of the present invention.

Referring now more specifically to the hub 40, it is, in part, a conventionally splined hub 40, preferably comprising one or more of the following: i) a hub axle 54 intermediate a first spoke attachment flange 56 and a second spoke attachment flange 58; and ii) a splined structure 60 at a distal end of the hub axle 54 that is opposite one of the respective spoke attachment flanges 56, 58. As known, the splined structure 60 of the hub 40 is adapted for mating alignment with the rotor 38. Thus, other conventional parts of the hub 40 are not generally described or otherwise illustrated herein, except as they will relate to the inventive arrangements.

As previously mentioned, the splined structure 60 of the hub 40 is adapted for mating alignment with the rotor 38. More specifically, the rotor 38—and even more specifically, the internal carrier 50 of the rotor 38 if the rotor 38 contains such—contains an internally disposed, cylindrically splined surface 62 that is sized and suited to be received on the splined structure 60 of the hub 40.

As such, the splined surface 62 of the rotor 38 defines a circular opening 64 therein and includes one or more axially disposed internal splines 66 (which are only representatively labeled in the figures) extending generally between an internal side 68 of the splined surface 62 and an external side 70 thereof, the internal side 68 being proximal to the hub 40 and the external side 70 being axially distant relative thereto when the rotor 38 is installed on the hub 40. Likewise, the splined structure 60 of the hub 40 includes one or more axially disposed external splines 72 (which are only representatively labeled in the figures) extending generally between an internal side 74 of the splined structure 60 and an external side 76 thereof, the internal side 74 being proximal to the hub 40 and the external side 76 being axially distant relative thereto.

This arrangement permits the internal splines 66 of the rotor 38 and the external splines 72 of the hub 40 to matingly and axially align and then non-rotably engage one another relative thereto. This rotably secures the rotor 38 to the hub 40 and imparts rotable forces therebetween. And, since these types of spline-alignments between the rotors 38 and the hubs 40 are well-known, they are not generally described or otherwise illustrated herein, except as they will relate to the inventive arrangements.

Now then, as will be subsequently elaborated upon below, the rotor 38 is removably secured to the hub 40 without using any bolts, locking rings, tools, or adapters, according to which the splined surface 62 of the rotor 38 is altered relative to a conventional or non-altered splined surface 62, according to at least one or more of the following two (2) embodiments of the inventive arrangements.

First Embodiment

Figure 9:
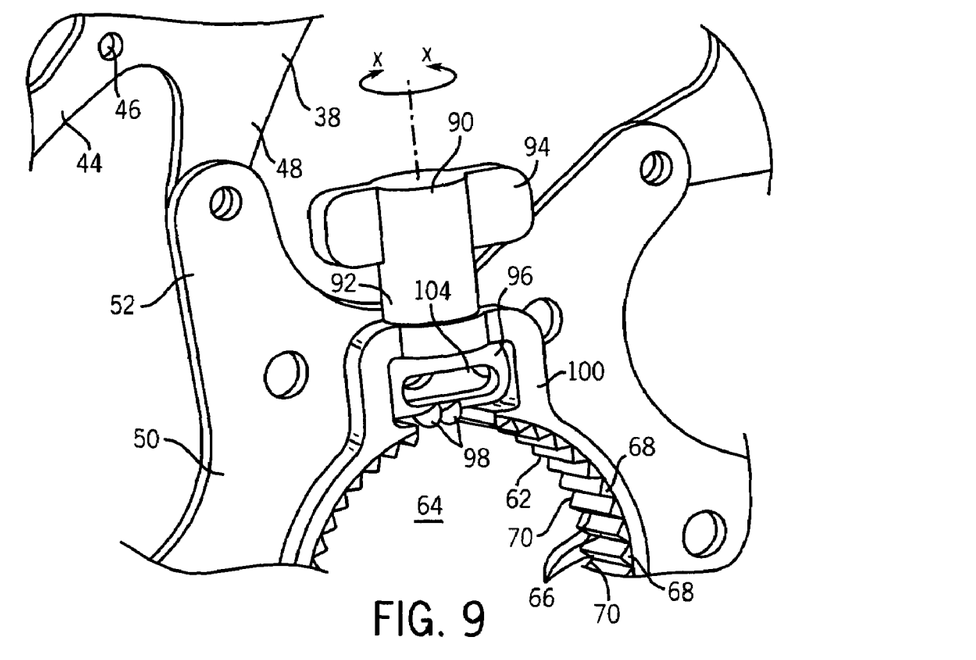
FIGS. 9-11 are partial perspective views of a disc brake rotors according to a first embodiment of the present invention, in which a locking hammer is carried by a carrier pocket formed in the rotor.
Figure 10:
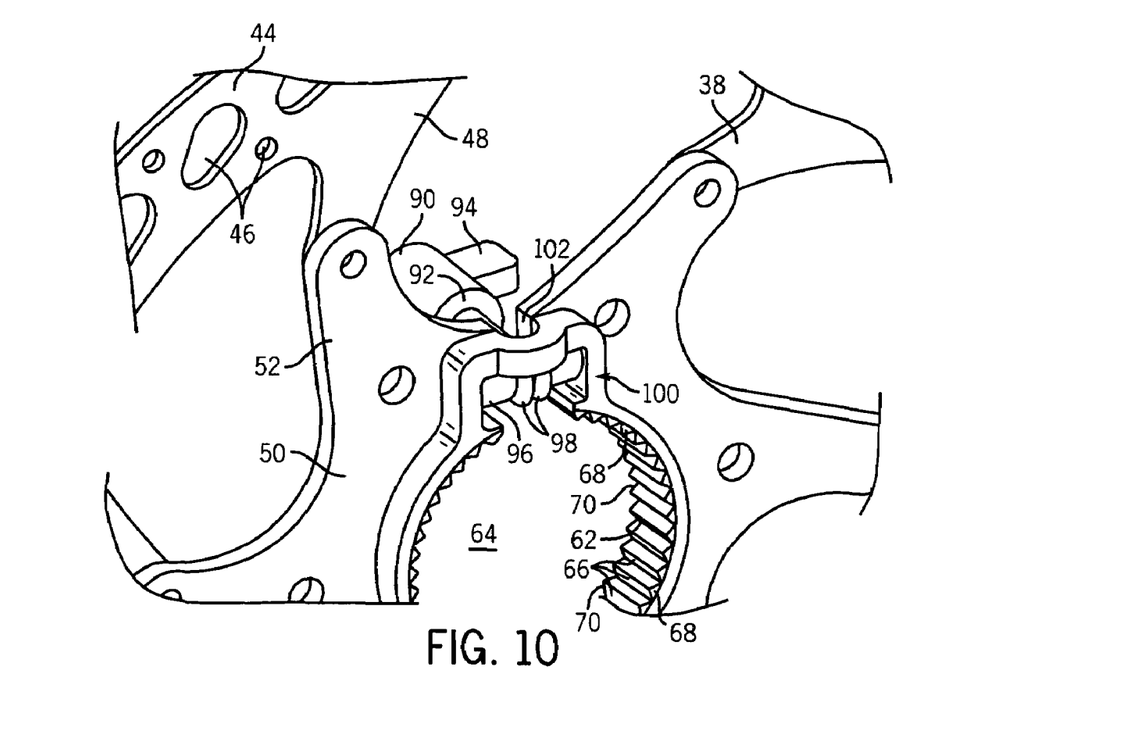
Figure 11:
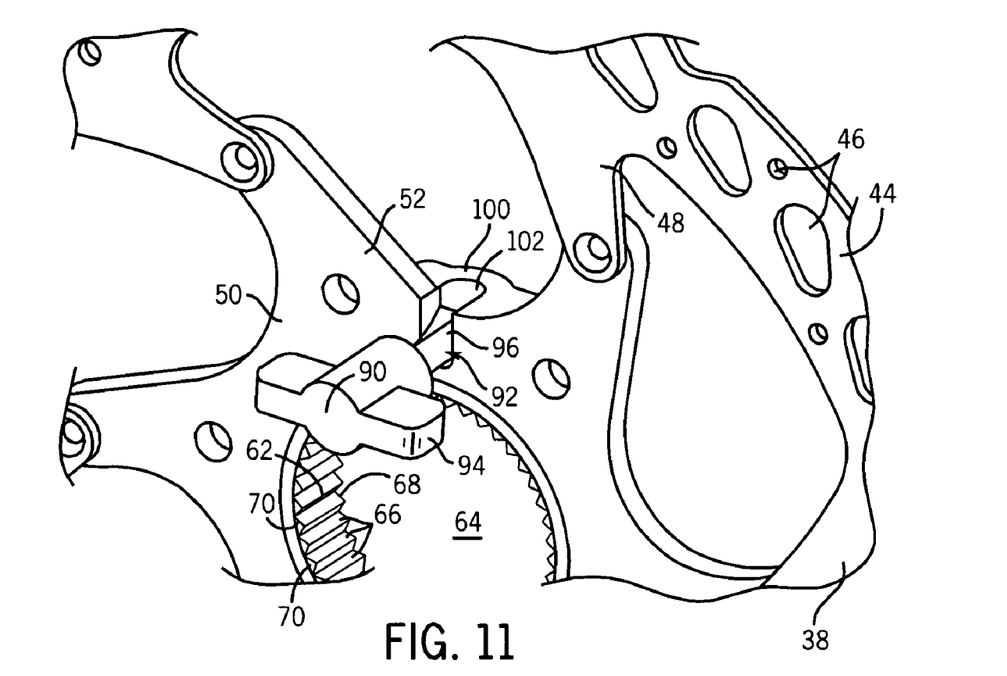

Referring now to FIGS. 9-11, the rotor 38 carries a workpiece 90 that is generally T-shaped and has a shaft 92 with a finger-grip 94 at one distal end of the shaft 92 and a locking hammer 96 at another distal end of the shaft 92. The locking hammer 96 of the workpiece 90 comprises one or more hammer-splines 98, which are generally shaped and sized to function as a part of the axially disposed internal splines 66 of the rotor 38 when they are so aligned.

Preferably, these hammer-splines 98 are carried within a carrier pocket 100 of the rotor 38 that is formed to support the workpiece 90. More specifically, the carrier pocket 100 is formed proximal to, and outside of, the circular opening 64 of the rotor 38, and it externally supports the workpiece 90 while internally supporting the locking hammer 96. Preferably, it is formed with an elbow 102 that permits e.g. 90° rotations of the workpiece 90. More specifically, the elbow 102 permits the shaft 92 of the workpiece 90 to rotate within the carrier pocket 100, and it allows the workpiece 90 (and thus, the locking hammer 96 and hammer-splines 98) to toggle between a locked position (FIG. 9) and an unlocked position (FIG. 10-11). As a result, the rotor 38 preferably contains the carrier pocket 100 that houses the workpiece 90 that toggles between locked and unlocked positions.

When the workpiece 90 is in the locked position (FIG. 9), the hammer-splines 98 align with the internal splines 66 of the rotor 38, and they thereby function as a part of the splined surface 62 of the rotor 38. However, when the workpiece 90 is in the unlocked position (FIGS. 10-11), the hammer-splines 98 do not align with the internal splines 66 of the rotor 38, and this allows the rotor 38 to be connected to or released from the hub 40, as desired. In other words, when the hammer-splines 98 of the workpiece 90 are not aligned with the internal splines 66 of the rotor 38, they do not function as a part of the splined surface 62 of the rotor 38, and thus, there is sufficient clearance or play or flexibility in the circular opening 64 of the rotor 38 to allow the rotor 38 to be placed onto or be removed from the hub 40. But, when the hammer-splines 98 of the workpiece 90 are aligned with the internal splines 66 of the rotor 38, most or all of any clearance between the internal splines 66 of the rotor 38 and the external splines 72 of the hub 40 is removed, thereby preventing the rotor 38 from being separated from the hub 40.

To further facilitate this flexibility of the hammer-splines 98, a preferred locking hammer 96 comprises an optional hollowed-interior hammer slot 104 (FIG. 9), to which the hammer-splines 98 are externally affixed or formed thereabout. Now then, this hammer slot 104 permits the hammer-splines 98 to flex internally towards the shaft 92 when a suitable force is applied thereto. More specifically, when the workpiece 90 (and thus, the locking hammer 96 and hammer-splines 98) is in the non-locked position, the rotor 38 can slide onto or off of the splined structure 60 of the hub 40 due to sufficient clearance between the rotor 38 and hub 40. Thereafter, when the rotor 38 slides onto the hub 40 and the workpiece 90 is rotated 90°, the hammer-splines 98 of the locking hammer 96 fixedly engage the splined structure 60 of the hub 40 as a part of the splined surface 62 of the rotor 38. Preferably, there is a radial interference fit between the hammer-splines 98 and the splined structure 60 of the hub 40, 50 that when the workpiece 90 is rotated into its locking position, the hammer slot 104 allows the hammer-splines 98 to partially deflect inwards towards the hammer slot 104, thereby inducing a pressure force from the hammer-splines 98 that secures the rotor 38 to the hub 40 by removing most or all of any radial clearance therebetween.

In another preferred embodiment hereof, the shaft 92 and the finger-grip 94 also comprise a well-known threaded orientation, whereby the finger-grip 94 can be rotated along the threaded orientation X-X in order to further ensure that the workpiece 90 (and thus, the locking hammer 96 and hammer-splines 98) remains in its locked position and that the hammer-splines 98 of the locking hammer 96 remain engaged with the splined structure 60 of the hub 40 as a part of the splined surface 62 of the rotor 38. In yet another embodiment, the threaded orientation can also effect (e.g., increase, decrease, reinforce, etc.) the afore-mentioned pressure force that secures the rotor 38 to the hub 40.

As indicated, the carrier pocket 100 is preferably formed with an elbow 102 that permits 90° rotations of the workpiece 90. Preferably, the elbow 102 is located on the external side 70 of the splined surface 62 of the rotor 38, so that its rotation into its unlocked position draws the finger-grip 94 away from the rotor 38 and the hub 40. Preferably, this ensures that the workpiece 90 will not interfere with the rotation of the rotor 38, and it facilitates the locking and unlocking of the workpiece 90, by which the hammer-splines 98 are brought into or out of alignment with the internal splines 66 of the rotor 38 as a part of the splined surface 62 thereof, for suitable engagement and disengagement with the splined structure 60 of the hub 40, as desired.

Thus, in this first embodiment, as described, the workpiece 90 can thus be employed to connect or release the rotor 38 to or from the hub 40, all without requiring any additional use of bolts, locking rings, tools, or adapters. The locking hammer 96 and its suitably corresponding hammer-splines 98 accomplish this task.

Second Embodiment

Figure 12:
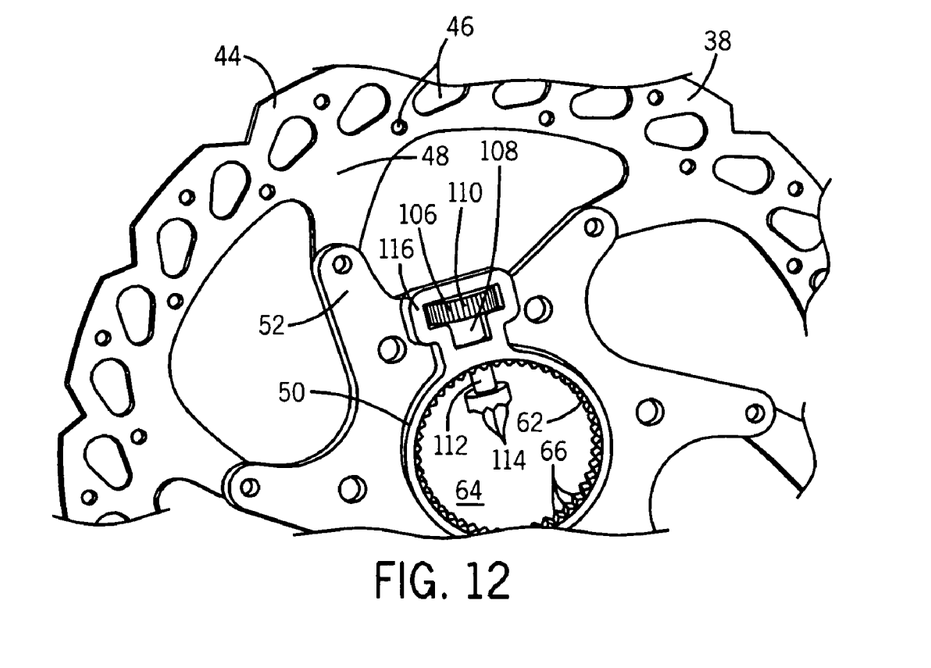
FIGS. 12-13 are partial perspective views of a disc brake rotors according to a second embodiment of the present invention, in which a locking foot is carried by a carrier pocket formed in the rotor.
Figure 13:
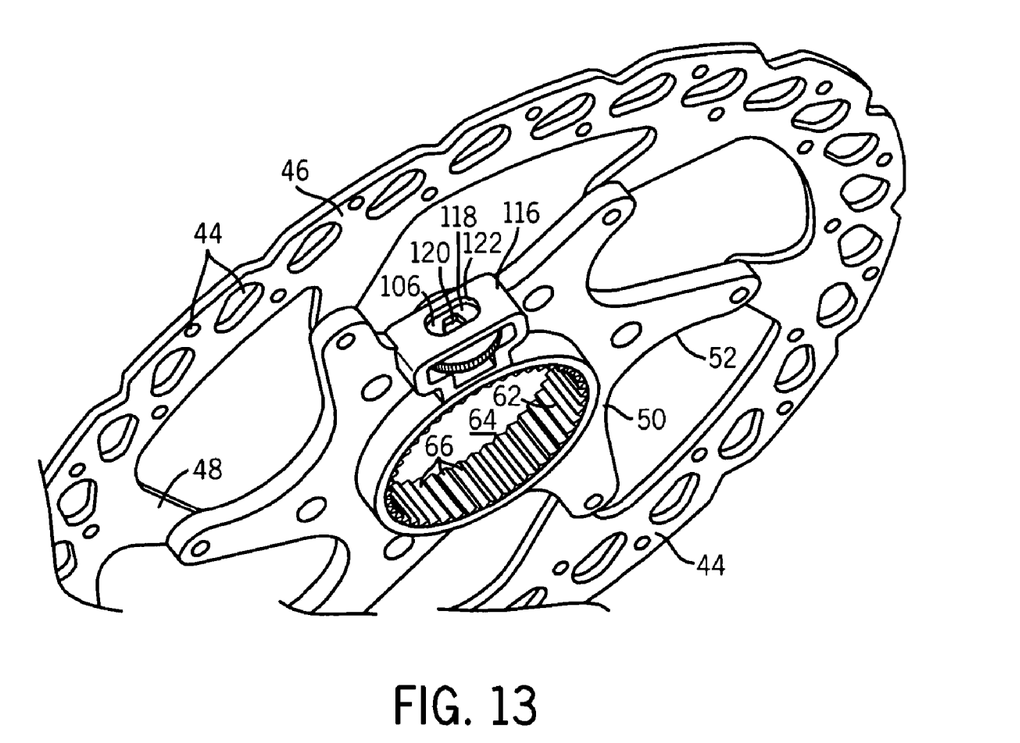

Referring now to FIGS. 12-13, the rotor 38 carries an alternative workpiece 106 that is generally T-shaped and has a threaded shaft 108 with a thumb wheel 110 at one distal end of the shaft 108 and a locking foot 112 at another distal end of the shaft 108. The locking foot 112 of the workpiece 106 comprises one or more foot-splines 114, which are generally shaped and sized to function as a part of the axially disposed internal splines 66 of the rotor 38 when they are so aligned.

Preferably, the work piece 106 is carried within a carrier pocket 116 formed within the rotor 38. More specifically, the carrier pocket 116 is formed proximal to, and outside of, the circular opening 64 of the rotor 38, and it generally supports the workpiece 106. As a result, the thumb wheel 110 can be rotated to allow the locking foot 112 to toggle between an extended position and a retracted position.

When the workpiece 106 is in its extended position, the foot-splines 114 align with the internal splines 66 of the rotor 38, and they thereby function as a part of the splined surface 62 of the rotor 38, as previously described. However, when the workpiece 106 is in the retracted position, the locking foot 112 and foot splines 114 are drawn into the carrier pocket 116 and thus out of the way of the circular opening 64 of the rotor 38. This allows the rotor 38 to be connected to or released from the hub 40, as desired. In other words, when the locking foot 112 and foot splines 114 are drawn into the carrier pocket 116, they do not function as a part of the splined surface 62 of the rotor 38, and thus, there is sufficient clearance or play or flexibility in the circular opening 64 of the rotor 38 to allow the rotor 38 to be placed onto or be removed from the hub 40. But, when the foot-splines 114 of the workpiece 90 are aligned with the internal splines 66 of the rotor 38, most or all of any clearance between the internal splines 66 of the rotor 38 and the external splines 72 of the hub 40 is removed, thereby preventing the rotor 38 from being separated from the hub 40, as previously described.

However, when the workpiece 116 is in its retracted position, the rotor 38 can be slid onto or off of the splined structure 60 of the hub 40 due to sufficient clearance between the rotor 38 and hub 40. Thereafter, when the rotor 38 is slid onto the hub 40 and the thumb wheel 110 is engaged to position the workpiece 106 into its extended position, the foot-splines 114 of the locking foot 112 fixedly engage the splined structure 60 of the hub 40 as a part of the splined surface 62 of the rotor 38, as previously described.

As described, the workpiece 106 has a threaded shaft 108 with a thumb wheel 110 at one distal end of the shaft 108 and a locking foot 112 at another distal end of the shaft 108. More specifically, the locking foot 112 also contains a threaded component in mating alignment with the threaded shaft 108, actuated by the thumb wheel 110. Thus, the threaded shaft 108 and locking foot 112 matingly align, whereby there is e.g. an internal thread on the threaded shaft 108 and an external thread on the locking foot 112.

In another preferred embodiment, a head 118 of the thumb wheel 110 also comprises e.g. an Allen socket 120 in order to further tighten or loosen the workpiece 106 into or out of its extended or retracted positions, preferably through an access opening 122 in the carrier pocket 116, as desired.

Thus, in this second embodiment, as described, the workpiece 106 can thus be employed to connect or release the rotor 38 to or from the hub 40, all without requiring any additional use of bolts, locking rings, tools, or adapters. The locking foot 112 and its suitably corresponding foot-splines 114 accomplish this task.

It should be readily apparent that this specification describes exemplary, representative, and non-limiting embodiments of the inventive arrangements. Accordingly, the scope of this invention is not limited to any of these embodiments. Rather, the details and features of these embodiments were disclosed as required. Thus, many changes and modifications—as apparent to those skilled in the art—are within the scope of the invention without departing from the scope hereof, and the inventive arrangements necessarily include the same. Accordingly, to apprise the public of the spirit and scope of this invention, the following claims are made:

What is claimed is:

1. A disc brake rotor, comprising:
   an internally disposed splined surface defining a circular opening and including one or more axially disposed internal splines that are adapted to be received on external splines of a splined structure of a wheel hub, said surface including a non-continuity that includes a cutaway portion of said surface into which independent splines are pivotably mounted and rotatably actuable about a fixed axis substantially tangential to the circular opening to align with said internal splines as a part of said surface to thereby allow said internal splines to engage said external splines and to allow said rotor to be connected to or released from said hub.

2. The disc brake rotor of claim 1, wherein said connection to or release from said hub is without using any tools.

3. The disc brake rotor of claim 1, wherein said independent splines are finger actuable.

4. A disc brake rotor for a bicycle, comprising:
   a non-continuous internally disposed splined surface defining a circular opening and including one or more axially disposed internal splines that are adapted to be received on external splines of a splined structure of a bicycle wheel hub, wherein said surface is adapted to receive independent splines to align with said internal splines as a part of said surface,
   wherein said independent splines are pivotably mounted and rotatably actuable about a fixed axis substantially tangential to the circular opening to align with said internal splines as a part of said surface and to allow said internal splines to engage said external splines.

5. The disc brake rotor of claim 4, wherein said independent splines are selectively actuable to align with said internal splines as a part of said surface to allow said rotor to be connected to or released from said hub without using any tools.

6. A disc brake rotor, comprising:
   an internally disposed splined surface defining a circular opening and including one or more axially disposed internal splines that are adapted to be received on external splines of a splined structure of a wheel hub; and
   a workpiece having (i) independent splines that are selectively actuable to align with said internal splines as a part of said surface and (ii) a locking hammer to which said independent splines are permanently affixed thereto or formed therefrom and (iii) a shaft having a grip at one distal end and the locking hammer at another distal end; and wherein said workpiece is supported by a carrier pocket of said rotor.

7. The disc brake rotor of claim 6, wherein said locking hammer includes a void space into which said independent splines flex upon alignment with said internal splines.

8. The disc brake rotor of claim 6, wherein said locking hammer is rotatable to bring said independent splines into alignment with said internal splines.

9. A disc brake rotor, comprising:
   an internally disposed splined surface defining a circular opening and including one or more axially disposed internal splines that are adapted to be received on external splines of a splined structure of a wheel hub; and
   a workpiece having independent splines that are selectively actuable to align with said internal splines as a part of said surface,
   wherein said workpiece is supported by a carrier pocket of said rotor, and said workpiece includes a locking foot to which said independent splines are externally affixed thereto or formed therefrom such that said independent splines are in continuous contact with the locking foot when not actuated, and wherein said locking foot is thread-wise rotatable through a thumb wheel to bring said independent splines into alignment with said internal splines to engage said external splines.

10. The disc brake rotor of claim 9, wherein said independent splines are selectively actuable to align with said internal splines as a part of said surface to allow said rotor to be connected to or released from said hub.

11. The disc brake rotor of claim 9, wherein said thumbwheel is finger actuable.

12. A disc brake rotor, comprising:

an internally disposed splined surface defining a circular opening and including one or more axially disposed internal splines that are adapted to be received on external splines of a splined structure of a wheel hub; and a pivotably mounted workpiece having (i) independent splines that are rotatably actuable about a fixed axis substantially tangential to the circular opening to align with said internal splines as a part of said surface and to allow said internal splines to engage said external splines and (ii) a locking hammer to which said independent splines are externally affixed or formed thereabout.

* * * * *